United States Patent [19]

Litchfield

[11] 4,002,261

[45] Jan. 11, 1977

[54] CONSTRUCTION OF PANELS, ENCLOSURES OR CONTAINERS

[75] Inventor: Leon George Litchfield, Youlgreave, England

[73] Assignee: L.B. (Plastics) Limited, Belper, England

[22] Filed: Oct. 29, 1975

[21] Appl. No.: 626,968

[30] Foreign Application Priority Data

Oct. 30, 1974 United Kingdom ............. 46910/74

[52] U.S. Cl. ............................... 220/80; 220/4 F; 220/83; 52/282; 52/285; 52/585

[51] Int. Cl.[2] ...................... B65D 7/00; B65D 7/42; E04B 1/00

[58] Field of Search ................ 220/80, 76, 73, 4 R, 220/4 F, 83, 84; 52/282, 285, 585; 428/52, 53, 99, 188

[56] References Cited

UNITED STATES PATENTS

| | | | |
|---|---|---|---|
| 2,960,249 | 11/1960 | Walsh | 220/4 F X |
| 3,019,867 | 2/1962 | Colombini | 52/585 X |
| 3,044,656 | 7/1962 | Combs et al. | 220/80 X |
| 3,485,519 | 12/1969 | Chiu | 52/585 X |
| 3,821,051 | 6/1974 | Withers | 428/188 X |

*Primary Examiner*—William Price
*Assistant Examiner*—Steven M. Pollard
*Attorney, Agent, or Firm*—Marshall & Yeasting

[57] ABSTRACT

A panel constituted by at least two panel members disposed edge to edge and each having cavities in the ends thereof, the panel members being interconnected at at least one end by a connecting member having spigot formations engaged in the cavities such that the connecting member bridges the panel members and retains them in abutment with one another. A plurality of such panels may be used to form the sides and ends of an enclosure or container such as a drawer in which case connecting members in the form of corner pieces may be used having two pairs of spigot formations projecting at right angles so as to connect adjacent sides together in addition to bridging the panel members forming each side.

16 Claims, 1 Drawing Figure

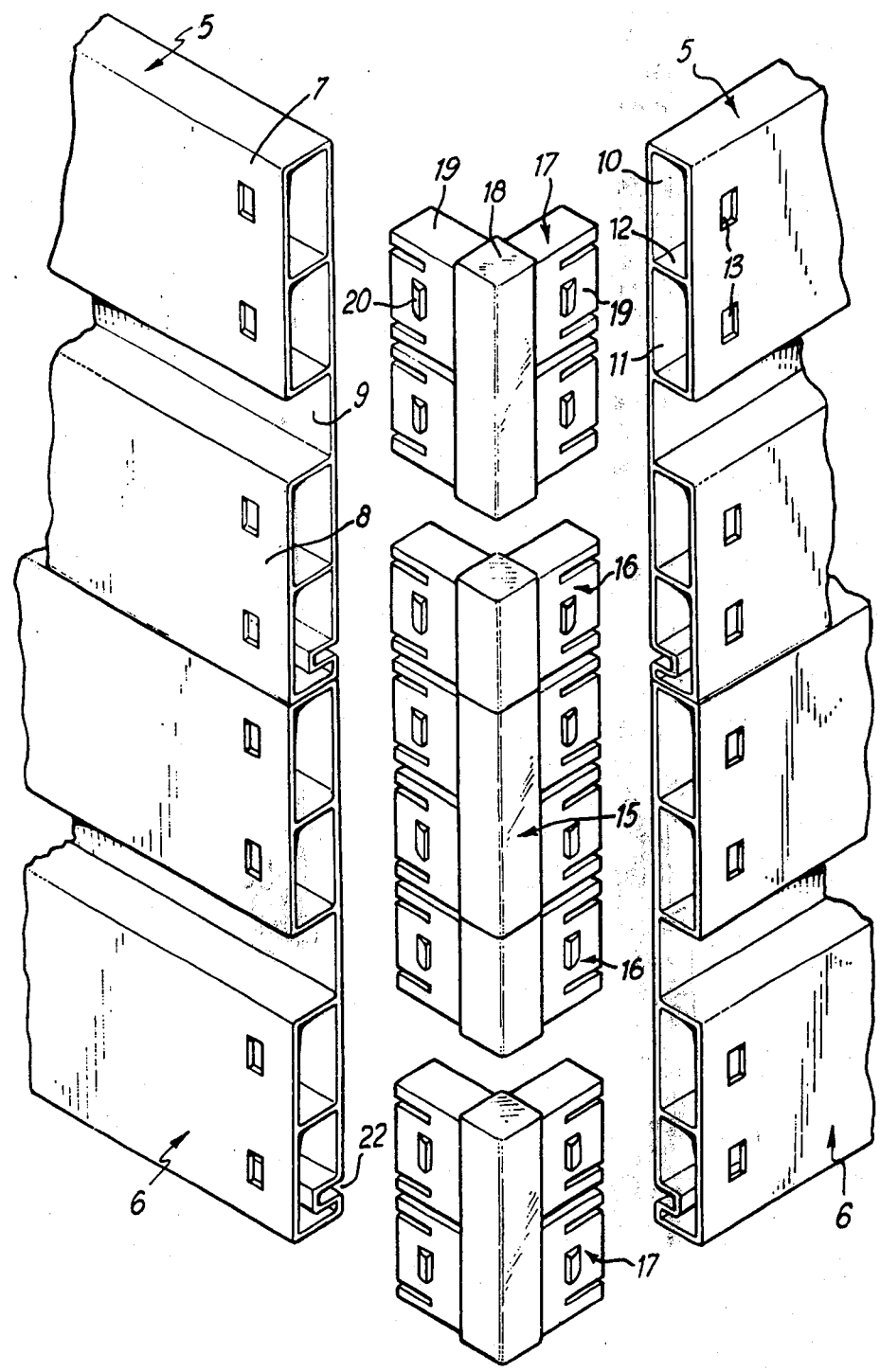

CONSTRUCTION OF PANELS, ENCLOSURES OR CONTAINERS

The invention relates to the construction of panels, enclosures or containers and is especially, but by no means exclusively, applicable to the construction of drawers.

The invention provides a panel constituted by at least two panel members disposed edge to edge and each having cavities in the ends thereof, the panel members being interconnected at at least one end by a connecting member having spigot formations engaged in said cavities such that the connecting member bridges the panel members and retains same in abutment with one another to form the panel.

Where the panel is to be used simply as a panel, connecting members will be provided at both ends thereof. Where the panel is to be used as a part of an assembly such as a drawer a connecting member may, in some circumstances, be used at only one end of the panel, the other ends of the panel members being held in abutment with one another by some other means.

Preferably at least two cavities are provided in each end of each panel member, the cavities being of similar shape, and the connecting members being substantially identical, each connecting member being engaged with one cavity of each panel member such that a multiplicity of such panel members may be interconnected to form a panel of any desired size. The cavities at the ends of the outermost panel members not occupied by connecting members may be engaged by further members having spigot formations engaged therein.

Preferably the panel members are of hollow extruded construction, said cavities extending throughout the length thereof. All the panel members may advantageously be of identical construction.

A plurality of such panels may be used to form the side and ends of an enclosure or container such as a drawer in which case the connecting members preferably comprise corner pieces having two pairs of spigot formations projecting therefrom at right angles to one another. The corner pieces thus bridge the panel members forming each side of the enclosure or container and also connect adjacent sides together at right angles. In such cases the further members referred to above may comprise additional corner pieces.

Preferably at least the lowermost panel member constituting each side is provided with a longitudinal recess in the inner face thereof towards its lower edge to receive a sheet constituting a base for the container.

When used in the construction of drawers, at least one panel member is preferably provided with a longitudinal recess in the outer face thereof between said cavities for engagement with a drawer runner on a cabinet or other article of furniture in which the drawer is to be accommodated in use. Such recess is preferably provided at a location above the centre of gravity of the assembled drawer.

The invention also provides a series of components for use in the construction of a panel, comprising a plurality of panel members having cavities in the ends thereof and a plurality of connecting members having spigot formations shaped and dimensioned so as to be engageable in said cavities, whereby the connecting members may bridge the junction or junctions between panel members disposed edge to edge so as to construct a panel.

The invention also provides a method of forming an enclosure or container having sides consisting of at least two panel members mounted one upon the other and interconnected by corner pieces having spigot formations engageable in cavities in the ends of the panel members, the method comprising utilising a corner piece to bridge the gap or gaps between the adjacent panel members forming each side of the enclosure or container whereby to simultaneously connect the panel members forming each side together and connect the sides together.

An embodiment of the invention will now be described, by way of example only, with reference to the accompanying drawing, which is an exploded perspective view of one corner of a deep drawer constructed in accordance with the invention.

Referring to the drawing, the drawer comprises four sides at least three of which are made from upper and lower panels 5 and 6. The fourth side or front of the drawer may be similar to the other three sides or could comprise a separate facia panel screwed or otherwise secured to the drawer sides. Each panel 5, 6 is of extruded plastics construction having upper and lower hollow sections 7 and 8 interconnected by a single vertical web 9. Each of the hollow sections 7, 8 consists of a pair of longitudinal cavities 10, 11 separated by a horizontal web 12 and is provided on the surface thereof which is outermost in use with an opening 13 engageable by a detent on corner pieces which interconnect the side members and are described hereafter.

The sides of the drawer are interconnected by corner pieces comprising a central bridging corner piece 15, a pair of smaller intermediate corner pieces 16 and a pair of outer corner pieces 17. Each corner piece comprises a central vertical post 18 of rectangular cross-section having spigot formations 19 projecting therefrom in two directions at right angles to one another. Each spigot formation is adapted to engage in one of the recesses 10, 11 of the panel members and a detent 20 formed on the outer face of each spigot 19 engages, when the spigots are pushed into engagement with the panels, with one of the openings 13 formed in the panels.

The central corner piece 15 forms a bridging piece the upper spigot portions 19 of which engage in the lower cavities 11 of the lower sections 8 of the upper panel members 5 constituting the adjacent sides of the drawer, and the lower spigot portions 19 of which engage in the upper cavities 10 of the upper sections 7 of the lower panel members 6 forming the adjacent sides of the drawer. This central corner piece therefore bridges the upper and lower panel members 5 and 6 of each pair and locks same together to form the drawer sides, and also serves to connect the adjacent drawer sides to one another at right angles. Interconnection of the sides is completed by engagement of the smaller central corner pieces 16 in the upper cavities 10 of the lower sections 8 of the upper panels 5 and in the lower cavities 11 of the upper sections 7 of the lower panels 6 respectively, and by engagement of the upper and lower corner pieces 17 in the upper sections 7 of the upper panels 5 and the lower sections 8 of the lower panels 6.

It should be appreciated that the upper and lower sections of each panel are of identical construction save for the provision of an inwardly directed longitudinal recess 22 in the inner face of each panel adjacent the lower edge thereof, the upper and lower panels are of identical construction, and the corner pieces consist of either one or two sections of identical construction. The short intermediate corner pieces consist of a single section having a central post 18 and two spigot formations 19. The bridging corner piece and the upper and lower corner pieces each consist effectively of two of the intermediate corner pieces. By virtue of the identical construction of the panel members and corner pieces only two major components are necessary in construction of a drawer or enclosure of any depth, namely the panel members, which can all be formed from a single extruded length, and the corner pieces, which can all be formed from corner pieces of the size of the bridging piece, the shorter pieces being formed by cutting a bridging piece into two separate sections. Where the product is a drawer which requires to have a bottom this can be constituted by a sheet engaged in the recesses 22 in the side panels previously referred to. In the case of a drawer the longitudinal recesses between the upper and lower sections 7 and 8 of the upper panel on each side of the drawer constitutes tracks engageable with runners in a cabinet or other enclosure in which the drawer is slidably housed.

It should be noted that the central posts of the corner pieces are of rectangular and not of square cross-section when viewed in plan. In this way the inner edges of the adjacent panels overlap one another and eliminate any gap which might otherwise be left at the inner corners of the drawer if the posts were of square cross-section.

It will be appreciated that by virtue of the arrangement described drawers or other containers or enclosures (which may be without bottoms) of any desired depth can be readily assembled from a plurality of identical panel members and corner pieces and the components described therefore provide a versatile system for the construction of containers and enclosures from a minimum of relatively simple and cheap components.

Various modifications may be made without departing from the invention. For example the track formed between the upper and lower sections of the illustrated panels can be omitted where the container is other than a drawer or where a simple bottomless enclosure is provided. The upper and lower sections could also consist of a single cavity rather than a pair of cavities as shown in the drawing. Moreover while the use of panel members of the same width in conjunction with identical connecting pieces is preferred as providing the maximum versatility, panel members of different widths may be interconnected in a similar manner. In some cases the panel members may have only one cavity in each end and the cavities in adjacent panel members may be of different dimensions provided connecting members having appropriately dimensioned spigot formations are used. Other means of securing the connecting members in the ends of the panel members could be utilised and this could be effected or enhanced by use of adhesive if desired. The various components are preferably made from synthetic plastics material but other materials could be used.

It should also be appreciated that while the invention has been described primarily with reference to the construction of containers or enclosures, two or more panel members may be connected together in the manner described to form larger panels or sheets for various purposes.

I claim:

1. A panel constituted by at least two panel members disposed edge to edge and each having cavities in the ends thereof, the panel members being interconnected at at least one end by a connecting member having spigot formations engaged in said cavities such that the connecting member bridges the panel members and retains same in abutment with one another to form the panel.

2. A panel according to claim 1 wherein the panel members are of hollow extruded construction, said cavities extending throughout the length thereof.

3. A panel according to claim 2 wherein at least two cavities are provided in each end of each panel member, the cavities being of similar shape and there being at least two connecting members which are identical, each connecting member being engaged with one cavity of each panel member.

4. A panel according to claim 3 wherein each of said cavities comprises two sections interconnected by a horizontal web.

5. A panel according to claim 3 wherein the connecting members are supplemented by further similar members having spigot formations engaged in the cavities not occupied by the connecting members.

6. A panel according to claim 3 wherein each connecting member comprises a corner piece having two pairs of spigot formations projecting therefrom at right angles to one another.

7. A panel according to claim 6 wherein the spigot formations of each connecting member are provided with detents engageable in openings in the panel members to retain the panel members and connecting members in engagement with one another.

8. A panel according to claim 7 wherein the panel members are of identical construction.

9. A panel according to claim 8 wherein at least one of the panel members is provided with a longitudinal recess in one face thereof adjacent its outer edge.

10. A panel according to claim 9 wherein the other of said panel members is provided with a recess in the face thereof opposite to the face of the first panel member in which said first-mentioned recess is formed.

11. A container in which each of at least three sides of the container is formed from at least two panel members disposed edge to edge and each having cavities in the ends thereof, the sides being interconnected at right angles to one another by corner pieces having two pairs of spigot formations projecting therefrom at right angles to one another and engaged in said cavities in the panel members such that the corner pieces in addition to connecting the sides together bridge the panel members and retain same in abutment with one another, the lower panel members of all three sides being provided with inwardly directed longitudinal recesses accommodating an edge of a sheet constituting a base for the container.

12. A drawer construction comprising a container according to claim 11 having a drawer front attached thereto.

13. A set of components for use in the construction of a panel, comprising a plurality of panel members having cavities in the ends thereof and a plurality of connecting members having spigot formations shaped and dimensioned so as to be engageable in said cavities, whereby the connecting members may bridge the junction or junctions between panel members disposed edge to edge so as to construct a panel.

14. A set of components according to claim 13 wherein at least one of said connecting members has spigot formations disposed at right angles to one another whereby to enable two or more similar panels to be interconnected at right angles to one another.

15. A set of components according to claim 14 wherein at least two cavities are provided in each end of each panel member, the panel members being of identical extruded construction and the connecting members also being identical.

16. A method of forming an enclosure or container having sides consisting of at least two panel members mounted one upon the other and interconnected by corner pieces having spigot formations engageable in cavities in the ends of the panel members, the method comprising utilising a corner piece to bridge the gap or gaps between the adjacent panel members forming each side of the enclosure or container whereby to simultaneously connect the panel members forming each side together and connect the sides together.

* * * * *